United States Patent
Azzam et al.

(10) Patent No.: US 12,311,889 B2
(45) Date of Patent: May 27, 2025

(54) MODULAR TRUCK BED RACK SYSTEM AND RELATED METHODS

(71) Applicant: TRUKD, LLC, Pittsburgh, PA (US)

(72) Inventors: Benjamin Richard Azzam, Glenshaw, PA (US); John Matthew Puskar-Pasewicz, Pittsburgh, PA (US)

(73) Assignee: TRUKD, LLC, Pittsburgh, PA (US)

( * ) Notice: Subject to any disclaimer, the term of this patent is extended or adjusted under 35 U.S.C. 154(b) by 210 days.

(21) Appl. No.: 17/959,367

(22) Filed: Oct. 4, 2022

(65) Prior Publication Data
US 2023/0108330 A1 Apr. 6, 2023

Related U.S. Application Data

(60) Provisional application No. 63/262,126, filed on Oct. 5, 2021.

(51) Int. Cl.
*B60R 9/06* (2006.01)
(52) U.S. Cl.
CPC ...................... *B60R 9/06* (2013.01)
(58) Field of Classification Search
CPC ............... B60R 9/00; B60R 9/06; B60R 9/08
USPC ............................... 296/3; 224/405; 410/105
See application file for complete search history.

(56) References Cited

U.S. PATENT DOCUMENTS

| | | | | |
|---|---|---|---|---|
| 2,124,082 A * | 7/1938 | Reifer | ................... | B61D 45/006 |
| | | | | 410/152 |
| 5,037,256 A * | 8/1991 | Schroeder | ............ | B61D 45/006 |
| | | | | 403/325 |
| 5,725,137 A * | 3/1998 | Macdonald | ............... | B60R 9/00 |
| | | | | 296/3 |
| 5,927,782 A * | 7/1999 | Olms | ........................ | B60R 9/00 |
| | | | | 224/403 |
| 5,988,722 A * | 11/1999 | Parri | ....................... | B60P 1/003 |
| | | | | 224/403 |
| 6,068,319 A * | 5/2000 | O'Brien | .................... | B60P 1/00 |
| | | | | 296/37.6 |
| 6,347,731 B1 * | 2/2002 | Burger | ..................... | B60R 9/00 |
| | | | | 224/403 |
| 6,536,640 B1 * | 3/2003 | Gent | ........................ | B60R 9/00 |
| | | | | 224/403 |

(Continued)

OTHER PUBLICATIONS

"Billie Bars", www.billiebars.com, Web Page "https://www.billiebars.com/products/bed-bars-for-tacoma-trucks", accessed on Feb. 8, 2023.

(Continued)

*Primary Examiner* — Justin M Larson
(74) *Attorney, Agent, or Firm* — Frost Brown Todd LLP

(57) ABSTRACT

A rack system for a vehicle and method of operating same includes an upright support bracket and a stability bracket. The upright support bracket has upper and lower portions with the upper portion having a bracket body and a bracket channel, and the lower portion configured to removably attach to the vehicle. The stability bracket has a shelf projection and a bracket base. The shelf projection extends from the bracket base and has a shelf bottom. The bracket base of the stability bracket is configured to be removably secure to the bracket body of the upright support bracket within the bracket channel of the upright support bracket in a predetermined position such that the shelf bottom is configured to support a mounting bar thereon.

20 Claims, 13 Drawing Sheets

(56) References Cited

U.S. PATENT DOCUMENTS

| | | | | |
|---|---|---|---|---|
| 6,971,563 | B2* | 12/2005 | Levi | B60R 9/0423 |
| | | | | 224/403 |
| 7,497,493 | B1* | 3/2009 | Thiessen | B60P 7/15 |
| | | | | 296/3 |
| 7,530,614 | B2* | 5/2009 | Nichols | B60P 7/0815 |
| | | | | 296/3 |
| 8,777,288 | B2* | 7/2014 | Johnasen | B60R 9/08 |
| | | | | 296/3 |
| 10,131,289 | B2* | 11/2018 | Frederick | B60R 9/08 |
| 10,207,650 | B1* | 2/2019 | Banegas | B60R 9/06 |
| D888,647 | S* | 6/2020 | Stoneburner | D12/406 |
| 11,072,294 | B2* | 7/2021 | Fehr | B60R 9/10 |
| 11,072,376 | B2* | 7/2021 | Condon | B60R 9/06 |
| 11,267,406 | B2* | 3/2022 | Deighton | B60P 7/10 |
| 11,541,948 | B2* | 1/2023 | Condon | B62D 33/0207 |
| 11,623,699 | B2* | 4/2023 | Mansell | E04H 15/06 |
| | | | | 224/405 |
| 11,731,564 | B1* | 8/2023 | Strawn | B60R 9/00 |
| | | | | 296/3 |
| 11,891,124 | B2* | 2/2024 | Kiefer, IV | B60R 9/08 |
| 11,987,295 | B2* | 5/2024 | Reyes | B60R 9/06 |
| 2008/0079277 | A1* | 4/2008 | Wethington | B60R 9/0485 |
| | | | | 296/3 |
| 2021/0129920 | A1* | 5/2021 | Mansell | B62D 33/0207 |
| 2022/0177053 | A1* | 6/2022 | Green | B62D 33/0207 |
| 2022/0306216 | A1* | 9/2022 | Hanson | B62D 33/0207 |
| 2022/0324391 | A1 | 10/2022 | Kiefer et al. | |
| 2022/0324392 | A1 | 10/2022 | Kiefer et al. | |
| 2022/0324522 | A1* | 10/2022 | Kiefer, IV | B62D 33/0207 |
| 2023/0108330 | A1* | 4/2023 | Azzam | B60R 9/06 |
| | | | | 224/405 |
| 2024/0001999 | A1* | 1/2024 | Cunningham | B60R 9/06 |

OTHER PUBLICATIONS

"Cali Raised", www.caliraisedled.com, Web Page "https://caliraisedled.com/products/overland-bed-rack", accessed on Feb. 8, 2023.

"CBI", www.cbioffroadfab.com, Web Page "https://www.cbioffroadfab.com/product/ford-ranger-overland-bed-bars-2019-2021", accessed on Feb. 8, 2023.

"Fishbone", www.fishboneoffroad.com, Web Page "https://www.fishboneoffroad.com/products/fishbone-full-tackle-rack-gladiator-full-bed-rack", accessed on Feb. 8, 2023.

"KB Voodoo", www.kbvoodo.com, Web Page "https://www.kbvoodoo.com/toyota-tacoma-years-2016-to-present", accessed on Feb. 8, 2023.

"Leitner Designs", www.leitnerdesigns.com, Web Page "https://www.leitnerdesigns.com/products/classic-active-cargo-system-ldasm", accessed on Feb. 8, 2023.

"Maxbilt", www.maxbilt.com, Web Page "https://maxbilt.com/products/gladiator-bed-rack-short?variant=40276397228227", accessed on Feb. 8, 2022.

"Paramount", www.carid.com, Web page "https://www.carid.com/paramount-automotive/adjustable-height-rack-mpn-91-65205.html?product_ab_v5=1&product_ab_v3=1&view=418054&gclid=Cj0KCQiA37KbBhDgARIsAlzce14ZhR2szbVkVt7xZWJvUWNi8Mate1BG4QYsDiiaemKjhbhaOS8GUTQaAsvyEALw_wcB", accessed on Feb. 8, 2023.

"RCI", www.rcimetalworks.com, Web Page "https://www.rcimetalworks.com/product-category/all-bedracks/bedracks-toyota/", accessed on Feb. 8, 2023.

"Rhino Rack", www.rhinorack.com, Web Page "https://www.rhinorack.com/en-us/reconn-deck/", accessed on Feb. 9, 2023.

"Trail Racks", www.trailrax.com, Web Page "www.trailrax.com/products/gullwing-bed-rack-for-jeep-gladiator", accessed on Feb. 8, 2023.

"Thule", www.thule.com, Web Page "www.thule.com/en-us/roof-rack/truck-and-van-racks/thule-xsporter-pro-shift-_xsporter-pro-shift", accessed on Feb. 9, 2023.

"Uptop Overland", www.uptopoverland.com, Web Page "https://www.uptopoverland.com/collections/toyota-tacoma-bed-racks/products/tacoma-truss-bed-rack-2005-2021", accessed on Feb. 8, 2023.

"Xtrusion Overland", www.xtrusion-overland.com, Web Page "https://xtrusion-overland.com/collections/cargo-racks-modular-universal", accessed on Feb. 9, 2023.

"Yakima", www.yakima.com,, Web Page "https://yakima.com/prodcuts/overhaul-hd-system?_ga=2.45994919.2094780934.1668107677-266587118.1668107677", accessed on Feb. 8, 2023.

* cited by examiner

MODULAR TRUCK BED RACK SYSTEM AND RELATED METHODS

CROSS-REFERENCE TO RELATED APPLICATION

This application claims priority to U.S. Pat. App. No. 63/262,126, entitled "Modular Truck Bed Rack System," filed Oct. 5, 2021, the disclosure of which is incorporated by reference herein.

BACKGROUND

Trucks, such as pickup trucks, generally offer a comfortable interior for passengers and a durable, exterior bed for storage and hauling of gear. This combination of comfort and practical use have made trucks a popular option for transportation for both work and leisure activities. While stock arrangements of truck interiors and exteriors are suitable for a large variety of functions, many truck owners choose to customize their trucks with one or more accessories to better suit a particular application.

More specifically, in one example, a truck owner secures a truck bed rack system within the exterior bed of a pickup truck for greater cargo storage, improved accessibility, and/or improved aesthetics. Such uses may include, but are not limited to, work travel, overlanding, which includes trucks or other specialty vehicles traversing off-road and adventurous travel, as well as specialized arrangements for skis, bicycles, kayaks, etc. However, despite this wide variety of uses, many truck bed rack systems lack versatility of organization once assembled for use resulting in removal or installation difficulty in the field, lack of part adjustments, such as limited bar height adjustments, and/or incompatibility with other accessories. Such limited truck bed rack systems may also require additional mounts for securement of one or more additional features, such as an organizer panel for hauling and accessing gear.

There is thus a need for a modular rack system for a vehicle, particularly a modular truck bed rack system for a bed of a pickup truck, that addresses present challenges and characteristics such as those discussed above.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

Figure 1:
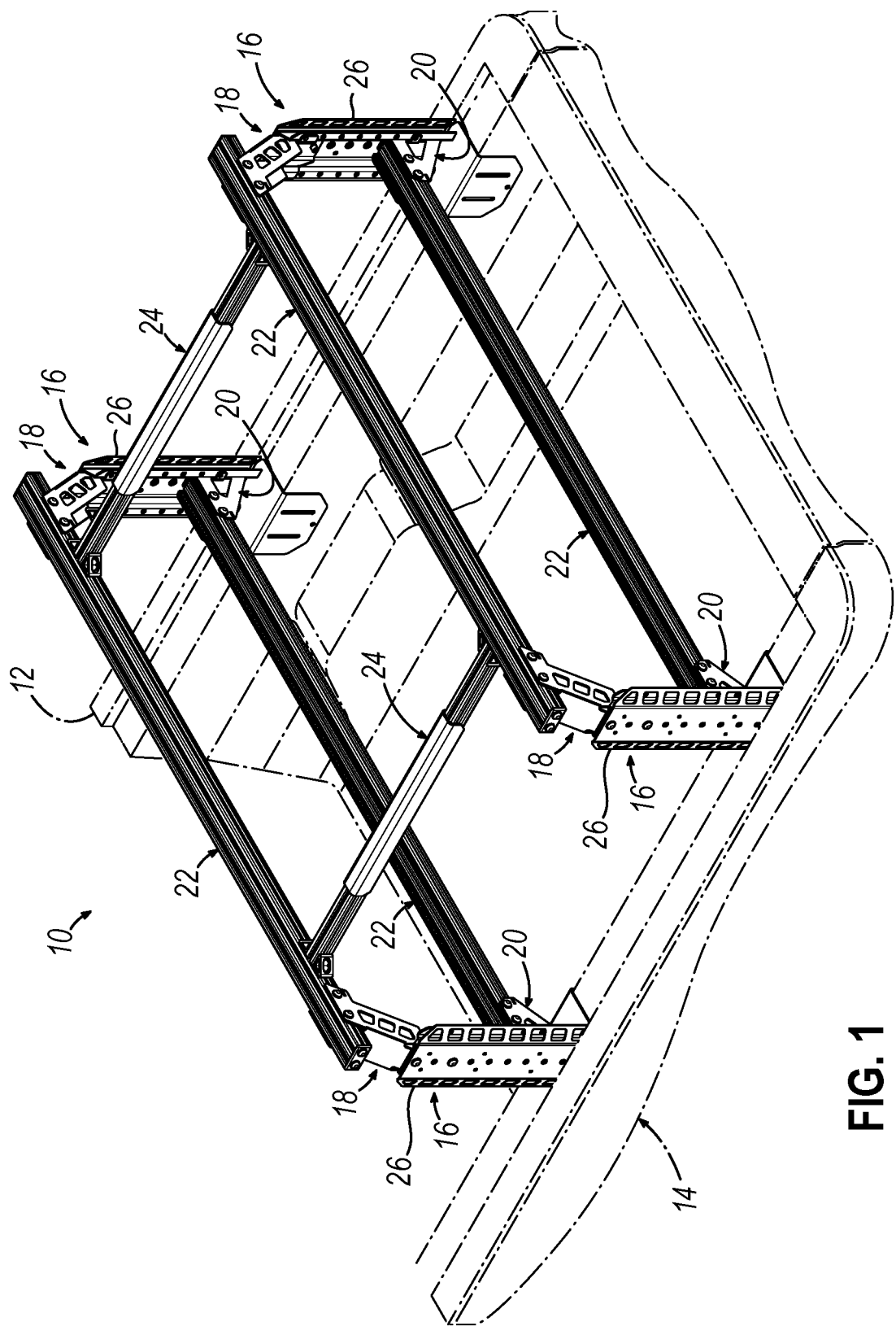
FIG. 1 depicts a perspective view of one example of a rack system secured to a bed of a pickup truck.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive. For example, the following descriptions and associated figures discuss and show a variety of fasteners for securement of one or more features, such as brackets, together. While some such fasteners are described and shown, others have been omitted for clarity such that the invention is not intended to be unnecessarily limited to the fasteners shown and described herein.

To the extent that spatial terms such as "top," "bottom," "upper," "lower," "vertical," "horizontal," or the like are used herein with reference to the drawings, it will be appreciated that such terms are used for exemplary description purposes only and are not intended to be limiting or absolute. In that regard, it will be appreciated that devices such as those disclosed herein may be used in a variety of orientations and positions not limited to those shown and described herein.

Furthermore, the terms "about," "approximately," and the like as used herein in connection with any numerical values or ranges of values are intended to encompass the exact value(s) referenced as well as a suitable tolerance that enables the referenced feature or combination of features to function for the intended purpose described herein.

I. Exemplary Modular Truck Bed Rack System

FIG. 1 shows one example of a rack system (10) secured to a bed (12) of a pickup truck (14). Rack system (10) includes a plurality of upright support brackets (16), a plurality of stability brackets (18, 20), a plurality of mounting bars (22), a plurality of crossbars (24), and a plurality of faceplates (26). Each upright support bracket (16) of the present example a lower portion (28) configured to removably attach to bed (12) and an upper portion (30) extending vertically upward from lower portion (28). Upper portion (30) is configured to removably secure to stability bracket (18, 20) for supporting mounting bars (22) and crossbars (24) as discussed below in greater detail. In addition, upper portion (30) is further configured to removably secure to faceplates (26) to provide additional utility as well as enhanced design aesthetics. In this respect, upper portion (30) is configured to removably secure to additional accessories, such as an accessory panel (32) (see FIG. 3). According to one example, four upright support brackets (16) are arranged in bed (12) to define four respective corners of rack system (10) on which to secure one or more portion of rack system (10) as desired, but alternative arrangements such as two upright support bracket (16) may be desired in other instances. While the present example shows rack system (10) secured within bed (12) of pickup truck (14), it will be appreciated that other vehicles may receive one or more portions of rack system (10) for use such that the invention is not intended to be unnecessarily limited to use with a pickup truck, such as pickup truck (14), and may be secured to alternative vehicles in other examples as desired. Similarly, the arrangement and relative positioning of upright support brackets (16), the plurality of stability brackets (18, 20), the plurality of mounting bars (22), and the plurality of crossbars (24) is merely exemplary. It will thus be appreciated that the modularity of these components may be used for any number of arrangements to vehicles such that the invention is not intended to be limited to this particular arrangement has shown in the present example.

Figure 2:
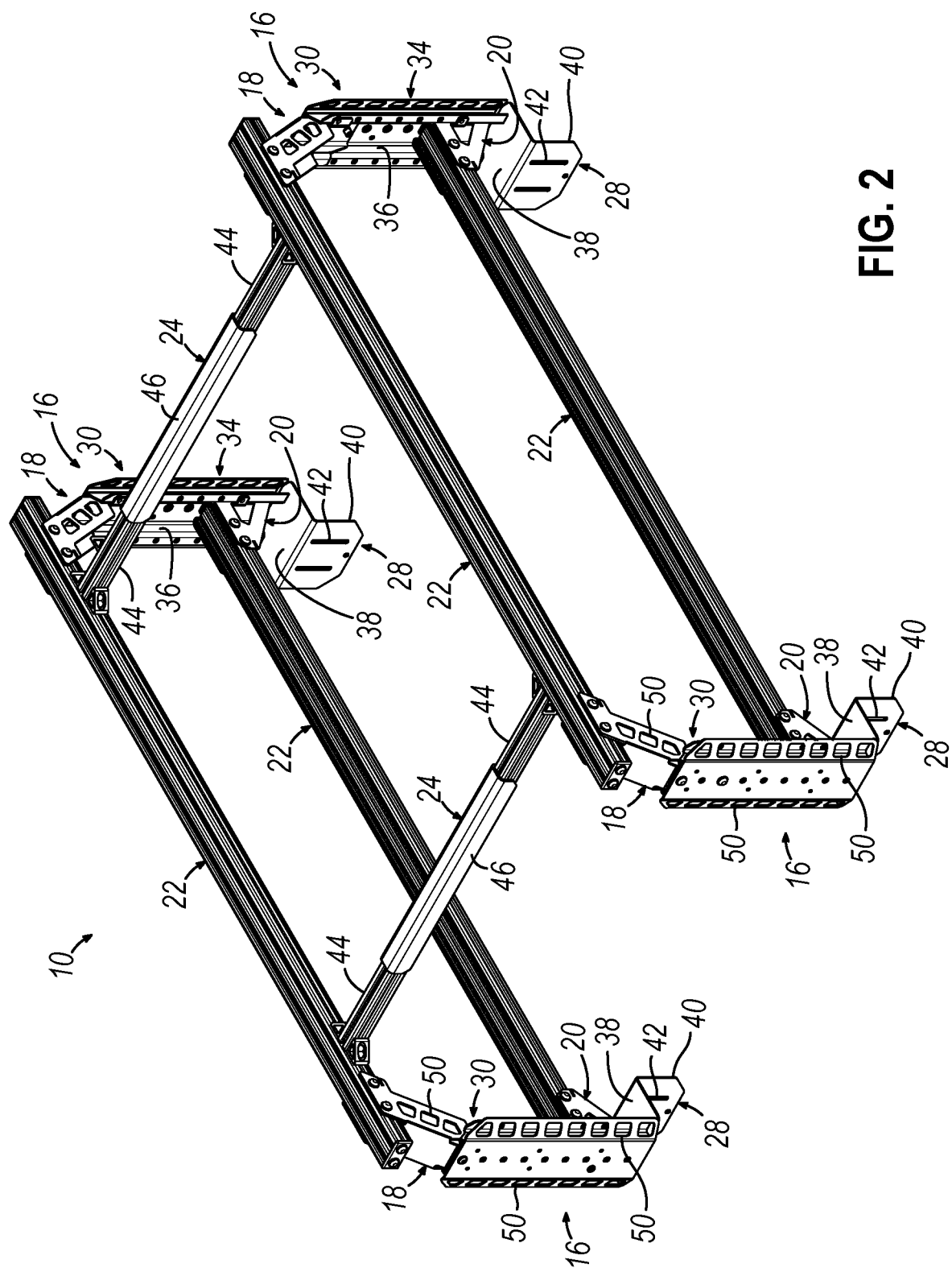
FIG. 2 depicts a perspective view of the rack system of FIG. 1 including a plurality of upright support brackets, a plurality of stability brackets, a plurality of mounting bars, a plurality of crossbars, and a plurality of faceplates.

To this end, and with respect to FIGS. 1 and 2, each of upright support brackets (16) has upper portion (30) including an upright bracket body (34) and an upright bracket channel (36), whereas lower portion (28) includes a seat plate (38) and a vehicle mount plate (40). Upright bracket body (34) of the present example is generally U-shaped and defines upright bracket channel (36) for receiving one or more stability brackets (18, 20) as discussed below in greater detail. Vehicle mount plate (40) has a pair of elongate slots (42) configured to receive fasteners (not shown) for removably secured to bed (12) while seat plate (38) rests on bed (12). Vehicle mount plate (40) extends downward from one lateral end of seat plate (38), whereas upright bracket body (34) extends upward from the other lateral end of seat plate (38) such that vehicle mount plate (40) and upright bracket body (34) extend in differing, offset planes.

With each upright support bracket (16) secured to bed (12), each of upright bracket channels (36) extends vertically and in parallel with the other of upright bracket channels (36) as shown in the present example. Such parallel alignment of upright bracket channels (36) allows for positioning and repositioning of any of stability brackets (18, 20) upward or downward in upright bracket channels (36) to removably secure to upright bracket bodies (34) without changing lateral lengths of mounting bars (22) or related couplings. In other words, the lateral width from a right upright support bracket (16) to a left upright support bracket (16) remains generally the same regardless of height for ease of positioning and repositioning any of stability brackets (18, 20). Also, a height of upright bracket bodies (34) is shown as 18 inches in the present example so as to provide ample clearance for securing upper and lower sets of stability brackets (18, 20) above and below each other and/or providing for more placement options at various heights along upright support bracket (16). Alternative heights of upright support bracket (16), such as taller or shorter upright support brackets (16), including but not limited to 12 inches or 6 inches, may be similarly used such that the invention is not intended to be unnecessarily limited to the particular height of upright support bracket (16) shown herein.

Stability brackets (18, 20) support laterally extending mounting bars (22) from left to right therebetween, while crossbars (24) are shown in the present example as longitudinally extending from forward to back between mounting bars (22). Each of mounting bars (22) are singularly and unitarily formed of extruded aluminum in one example and may be formed to a predetermined length. Additionally or alternatively, mounting bars (22) may be formed of other materials, including, but not limited to metals, such as steel, engineered plastics, carbon-fiber composites, and/or other synthetic materials. In one example, each of crossbars (24) is formed, at least mostly, of aluminum, but assembled from opposing end portions (44) telescopically connected by a sleeve (46) and thereby configured to adjust to one of any available variable lengths. Additionally or alternatively, crossbars (24) may be formed of other materials, including, but not limited to metals, such as steel, engineered plastics, carbon-fiber composites, and/or other synthetic materials. Each of mounting bars (22) and crossbars (24) has a plurality of T-slots (48) configured to receive associated fasteners for assembly of rack system (10) as desired and/or for mounting other accessories or gear during use.

Figure 3:
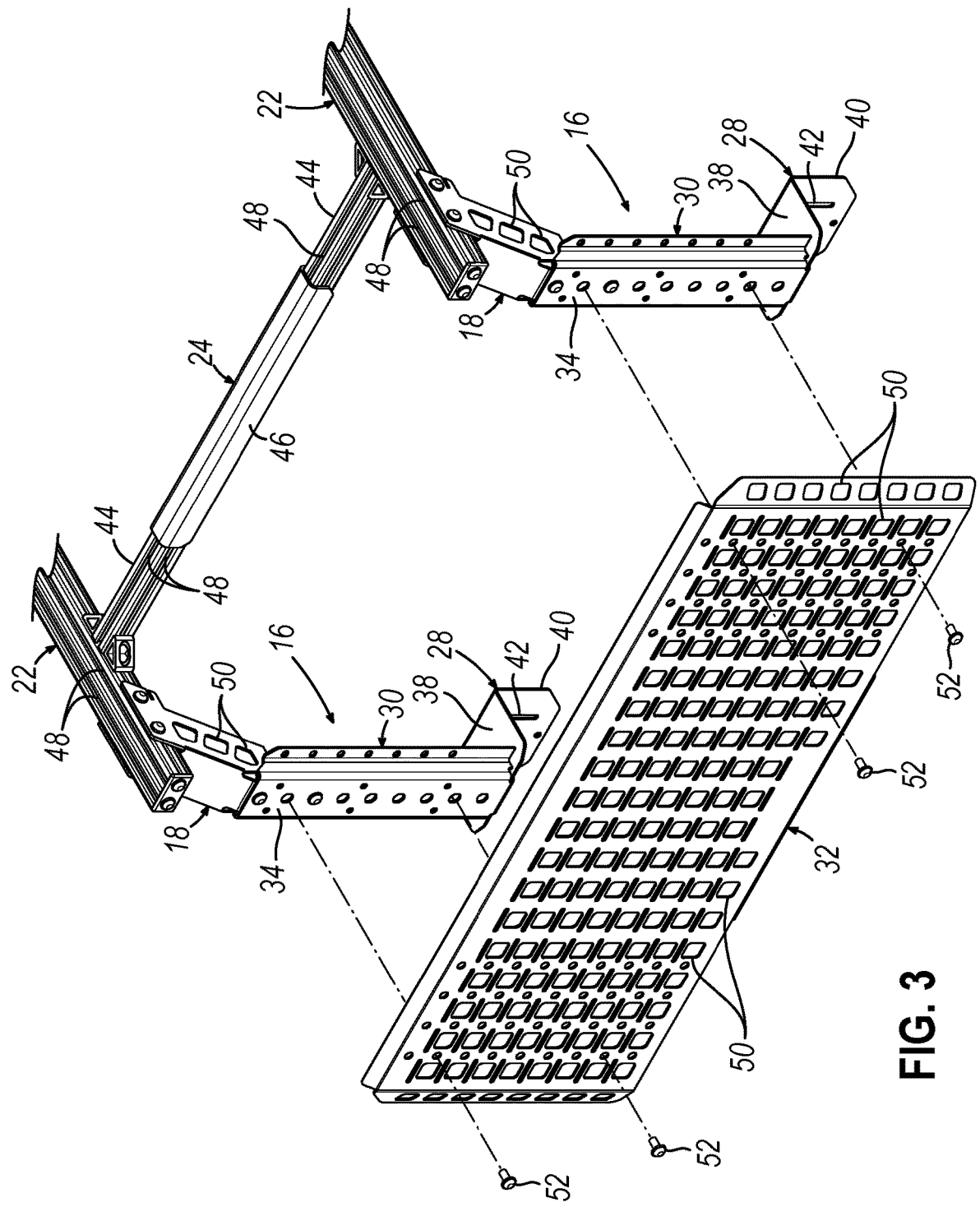
FIG. 3 depicts an enlarged, partially exploded perspective view of the rack system of FIG. 2 with various faceplates removed and replaced with an accessory panel.

To this end, with respect to FIGS. 2-3, many components of rack system (10), including, but not limited to faceplates (26) and stability brackets (18), define a plurality of openings (50) configured to receive one or more accessories or gear during use. For example, a user may attach an accessory, such as via a fastener, clip, and/or strap, to rack system (10) through such openings (50). Furthermore, a pair of faceplates (26) shown in FIG. 2 may be removed and replaced with accessory panel (32) as shown in FIG. 3. Accessory panel (32) similarly has a plurality of such openings (50) configured to receive one or more accessories or gear. In one example, accessory panel (32) is configured to longitudinally extend from one forward upright support bracket (16) to one rearward upright support bracket (16) and be secured to both by a plurality of fasteners (52). More particularly, accessory panel (32) directly connects to forward and rearward support brackets (16) to vertically extend in parallel with upright support brackets (16) to provide more options for attachment arrangements and versatility of use rather than spacing accessory panel (32) from such support bracket (16), which tends to create unusable space therebetween. Still, rack system (10) may be optional in some examples and is not intended to unnecessarily limit the invention described herein.

Figure 4:
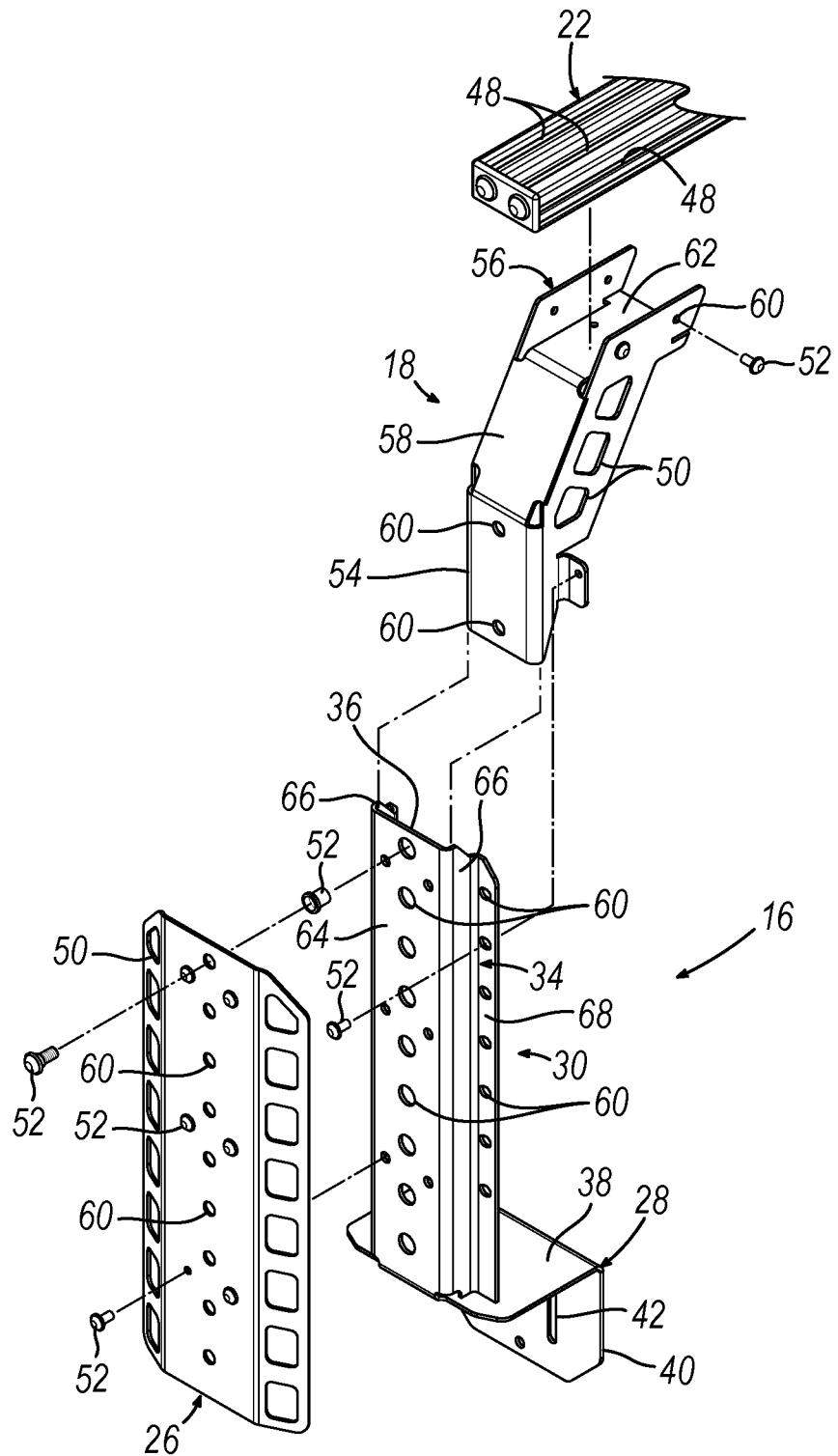
FIG. 4 depicts an enlarged, partially exploded outer perspective view of the upright support bracket of FIG. 2 with a riser stability bracket of the plurality of stability brackets of FIG. 2.
Figure 5:
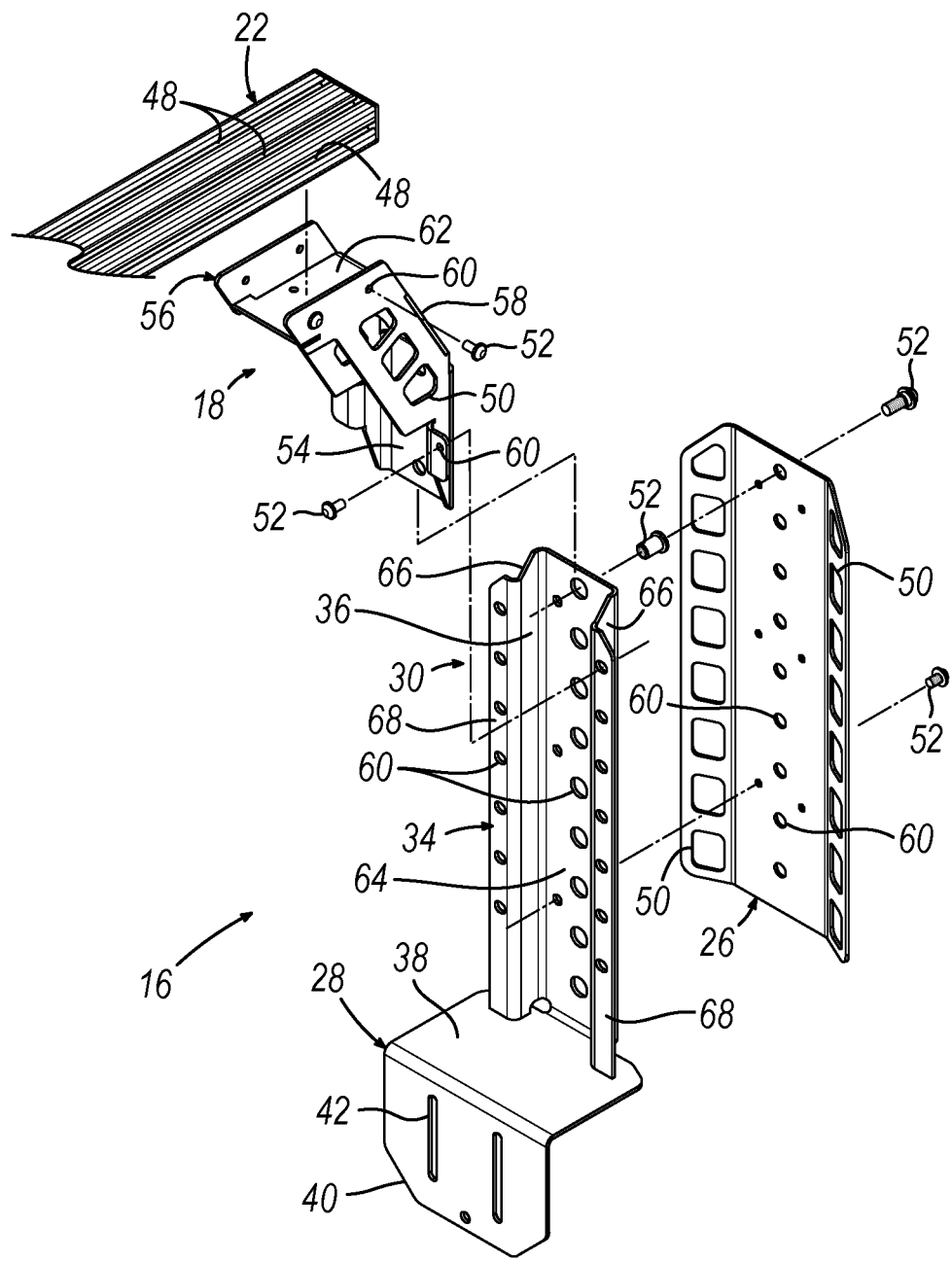
FIG. 5 depicts an enlarged, partially exploded inner perspective view of the upright support bracket of FIG. 2 with the riser stability bracket of FIG. 4.

FIGS. 4 and 5 show one exemplary assembly of upright support bracket (16), faceplate (26), mounting bar (22), and stability bracket (18), which is more particularly a riser stability bracket (18). Riser stability bracket (18) includes a riser bracket base (54), a riser shelf projection (56), and an angled riser member (58) extending therebetween. More particularly, angled riser member (58) extends laterally inward and transversely upward from riser bracket base (54) such that riser shelf projection (56) is offset inward and offset upward from riser bracket base (54). In addition, riser bracket base (54), while received within upright bracket channel (36), connects to upright bracket body (34) via a plurality of holes (60) and fasteners (52). Relative height positioning of riser stability bracket (18) in upright bracket channel (36) may be selected and/or adjusted as desired by the user upon choosing appropriate holes (60) at differing vertical heights. Riser shelf projection (56) of the present example has a generally U-shaped portion with a shelf bottom (62) thus configured to receive mounting bar (22) and further fastening thereto via T-slots (48) and fasteners (not shown). In this respect, according to one example, mounting bars (22) are configured to be secured relative to riser stability bracket (18) without a threaded fastener, such as a threaded hole and/or threaded bolt, being threaded into engagement with mounting bar (22). Such avoidance of threaded coupling to mounting bar (22) in one example tends to increase the usable life of mounting bar (22), particularly when mounting bar (22) is formed of a relatively softer material, such as aluminum.

While upright bracket body (34) of the present example defines upright bracket channel (36), upright bracket body (34) more particularly includes a planar back plate (64) with planar sidewalls (66) extending therefrom in a U-shaped cross-section. Flared end portions (68) extend from each respective planar sidewalls (66) for additional coupling surfaces with holes (60) for greater stability and securement. During height adjustment, riser bracket base (54) may thus be easily slid against upright bracket body (34) upward or downward through upright bracket channel (36) as desired by the user for repositioning.

Figure 6:
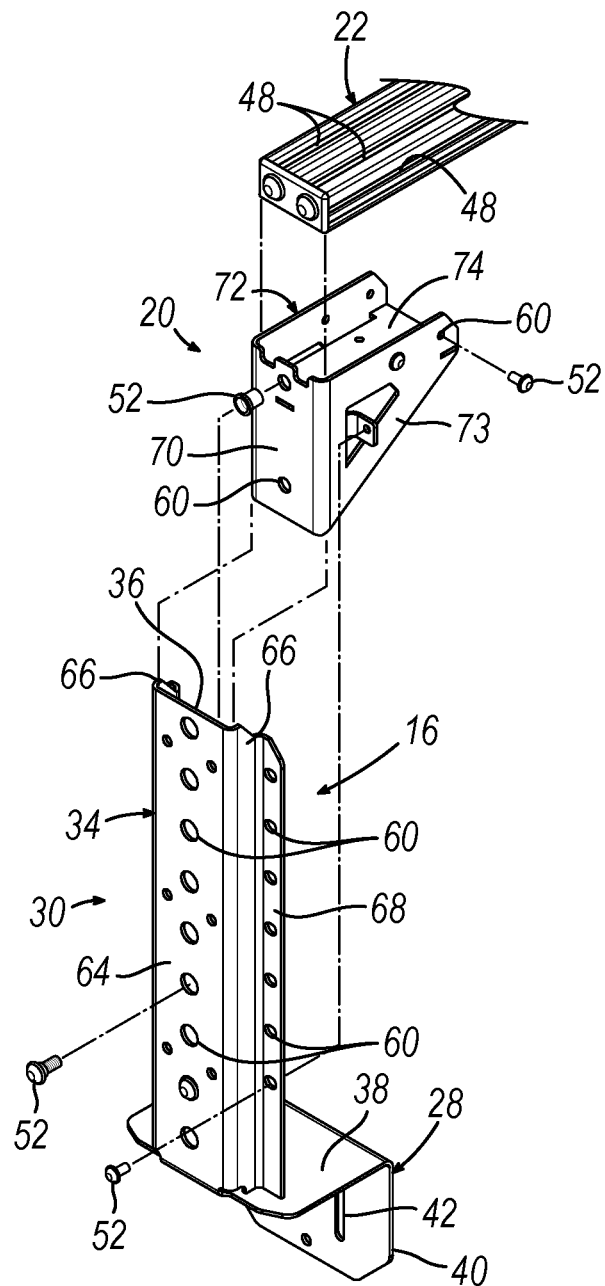
FIG. 6 depicts an enlarged, partially exploded outer perspective view of the upright support bracket of FIG. 2 with a central stability bracket of the plurality of stability brackets of FIG. 2.
Figure 7:
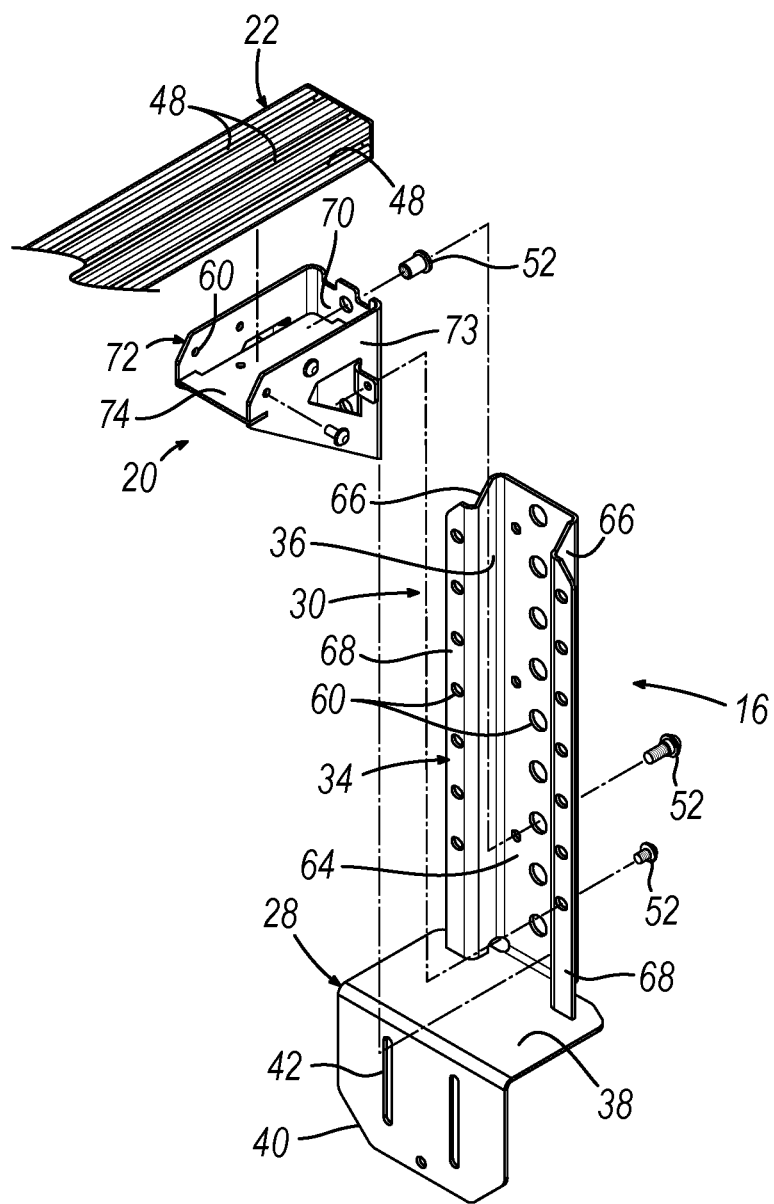
FIG. 7 depicts an enlarged, partially exploded inner perspective view of the upright support bracket of FIG. 2 with the central stability bracket of FIG. 6.

FIGS. 6 and 7 show one exemplary assembly of upright support bracket (16), mounting bar (22), and stability bracket (20), which is more particularly a central stability bracket (20). Central stability bracket (20) includes a central bracket base (70), a central shelf projection (72), and an angled central member (73) extending therebetween. More particularly, angled central member (73) extends laterally inward and transversely upward from central bracket base (70) such that central shelf projection (72) also extends from central bracket base (70) in a generally triangular shape. In addition, central bracket base (70), while received within upright bracket channel (36), connects to upright bracket body (34) via holes (60) and fasteners (52). Relative height positioning of central stability bracket (20) in upright bracket channel (36) may be selected and/or adjusted as desired by the user upon choosing appropriate holes (60) at differing vertical heights. Central shelf projection (72) of the present example has a generally U-shaped portion with a shelf bottom (74) thus configured to receive mounting bar (22) and further fastening thereto via T-slots (48) and fasteners (not shown). In this respect, according to one example, mounting bars (22) are configured to be secured relative to central stability bracket (20) without a threaded fastener, such as a threaded hole and/or threaded bolt, being threaded into engagement with mounting bar (22). Such avoidance of threaded coupling to mounting bar (22) in one example tends to increase the usable life of mounting bar (22), particularly when mounting bar (22) is formed of a relatively softer material, such as aluminum. Similar to riser stability bracket (18) (see FIG. 5), flared end portions (68) extend from each respective planar sidewalls (66) for additional coupling surfaces with holes (60) for greater stability and securement. During height adjustment, central bracket base (70) may thus be easily slid against upright bracket body (34) upward or downward through upright bracket channel (36) as desired by the user for repositioning.

Figure 8A:
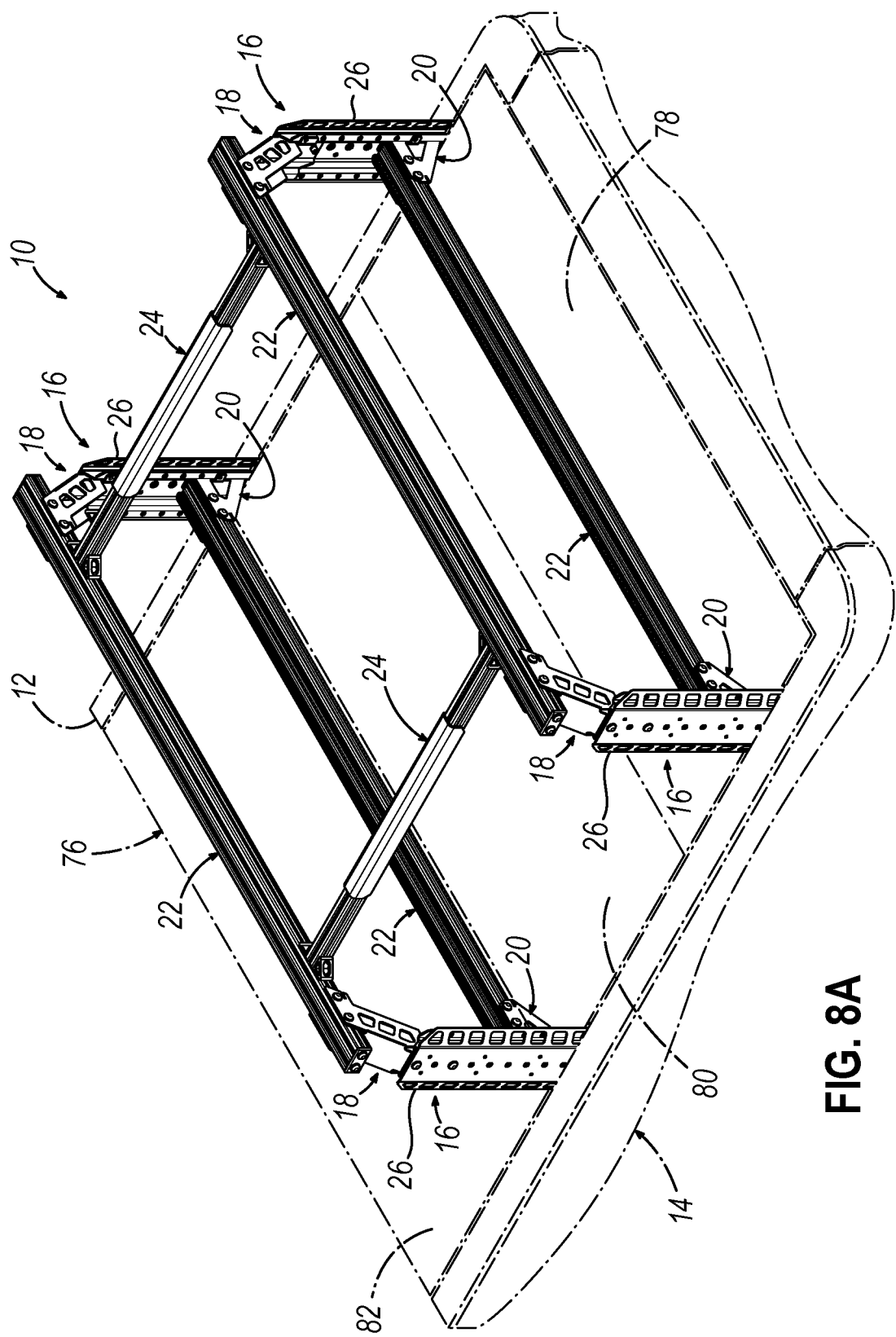
FIG. 8A depicts a perspective view of the rack system of FIG. 2 secured to the bed of the pickup truck with the bed covered in a closed position by a tonneau cover.

In use, with respect to FIG. 8A, riser stability bracket (18) of rack system (10) may be positioned above central stability bracket (20) in the same upright bracket channel (36). While central stability bracket (20) is configured to be positioned with a like height to upright support bracket (16) such that central stability bracket (20) does not extend downward or upward from upright support bracket (16) in the present example, riser stability bracket (18) is configured to extend inward and upward from upright support bracket (16). Riser stability bracket (18) may thus extend upward beyond upright support bracket (16) to a greater height than upright support bracket (16) for greater clearance under mounting bar (22) supported by riser stability brackets (18). Such increased clearance may provide for more mounting options for gear, tools, or even other mounting bar (22) depending on the height of any particular upright support bracket (16).

Figure 8B:
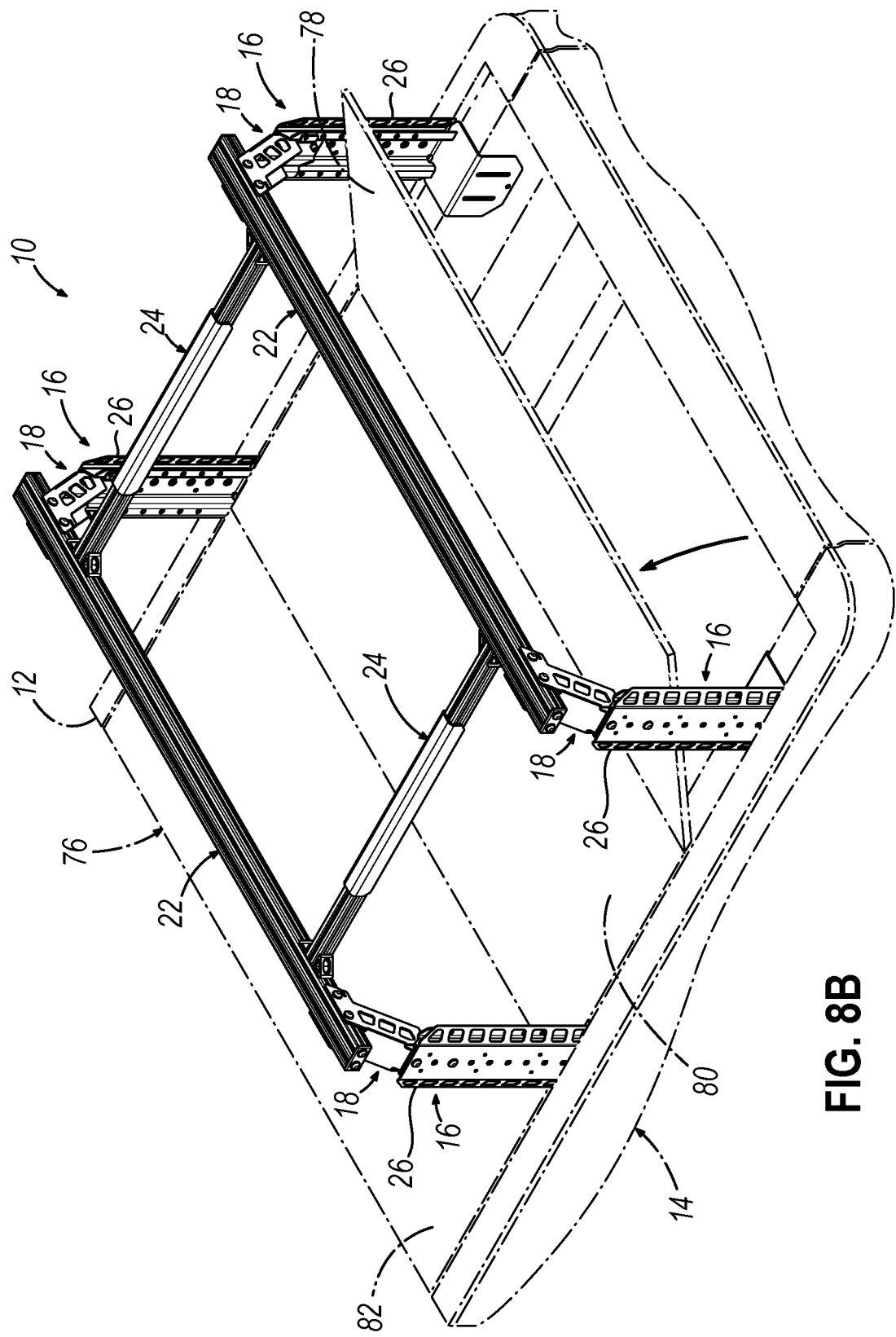
FIG. 8B depicts the perspective view of the rack system of FIG. 8A, but without the central stability brackets and associated mounting bars such that the tonneau cover is being uncovered from the closed position toward an opened position while the riser stability brackets and associated mounting bars and crossbars remain.
Figure 8C:
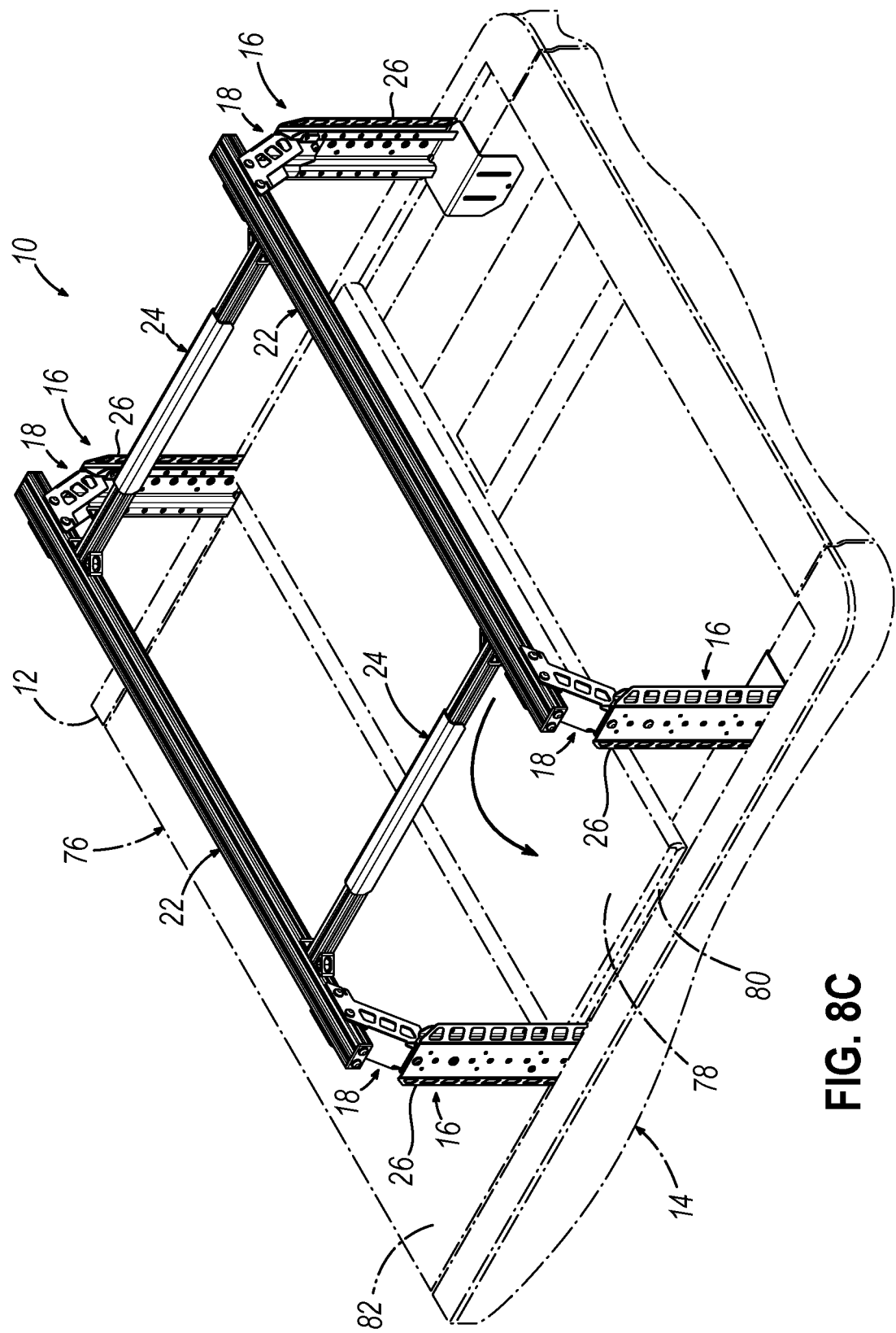
FIG. 8C depicts the perspective view of the rack system of FIG. 8B, but with the tonneau cover being further uncovered from the closed position toward the opened position.
Figure 8D:
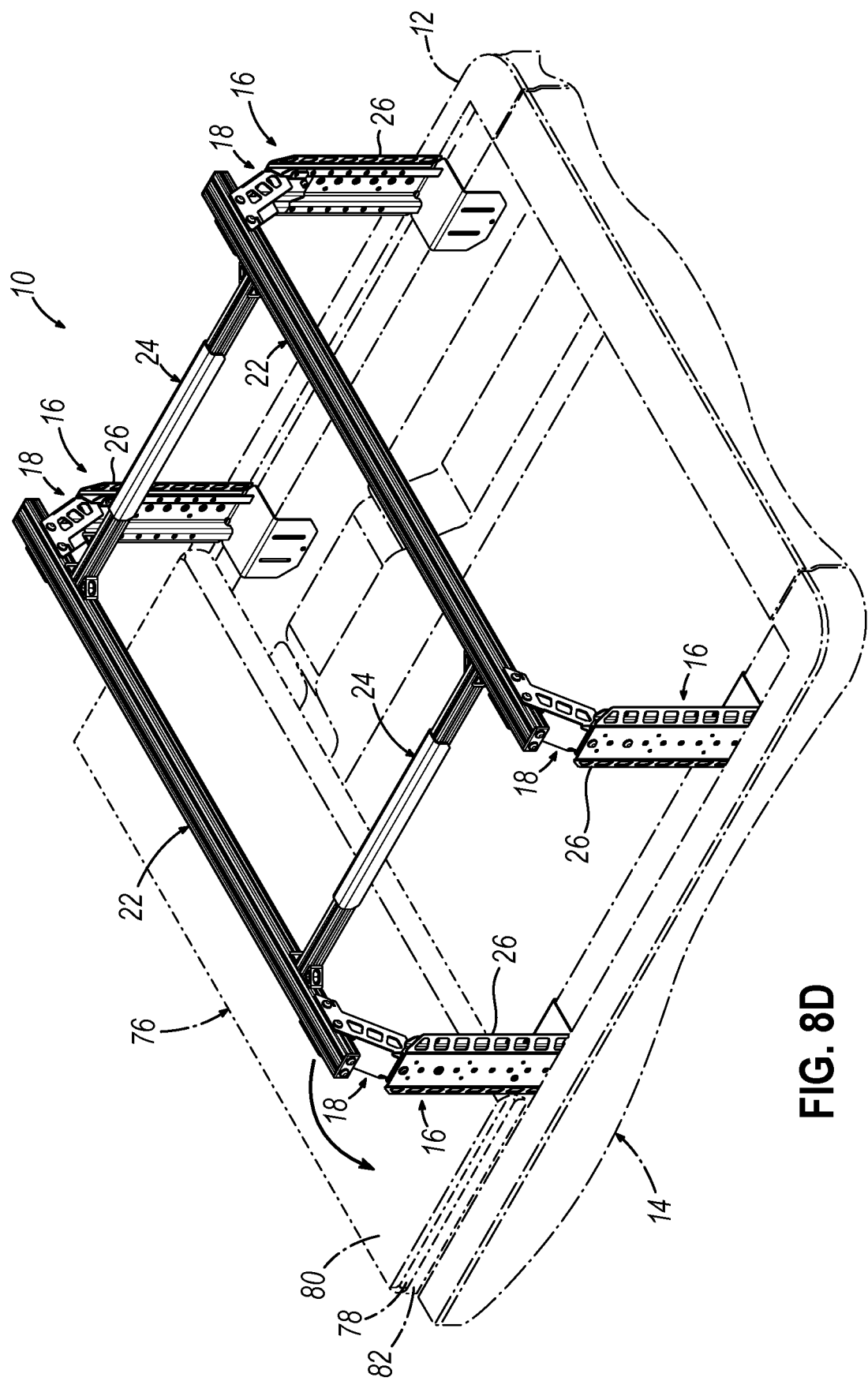
FIG. 8D depicts the perspective view of the rack system of FIG. 8C, but with the tonneau cover being still further uncovered from the closed position toward the opened position.

In one example of rack system (10), as shown in FIGS. 8B-8D, the increased clearance provided by riser stability brackets (18) allows for opening or closing of a bed cover, such as a tonneau truck cover (76), which folds by a plurality of foldable panels (78, 80, 82). More particularly, from a closed position of tonneau truck cover (76), foldable panel (78) pivots upward, clears mounting bar (22) without removing mounting bar (22) from riser stability brackets (18), and folds down onto foldable panel (80) as shown in FIGS. 8B and 8C. Similarly, foldable panels (78, 80) pivot up together, again clear mounting bar (22) without removing mounting bar (22) from riser stability brackets (18), and fold down onto foldable panel (82) as shown in FIG. 8D toward an opened position. While the present example shows rack system (10) used with tonneau truck cover (76), it will be appreciated that rack system (10) may be used with any compatible cover such that the invention is not intended to be unnecessarily limited to use with tonneau truck cover (76).

Figure 9:
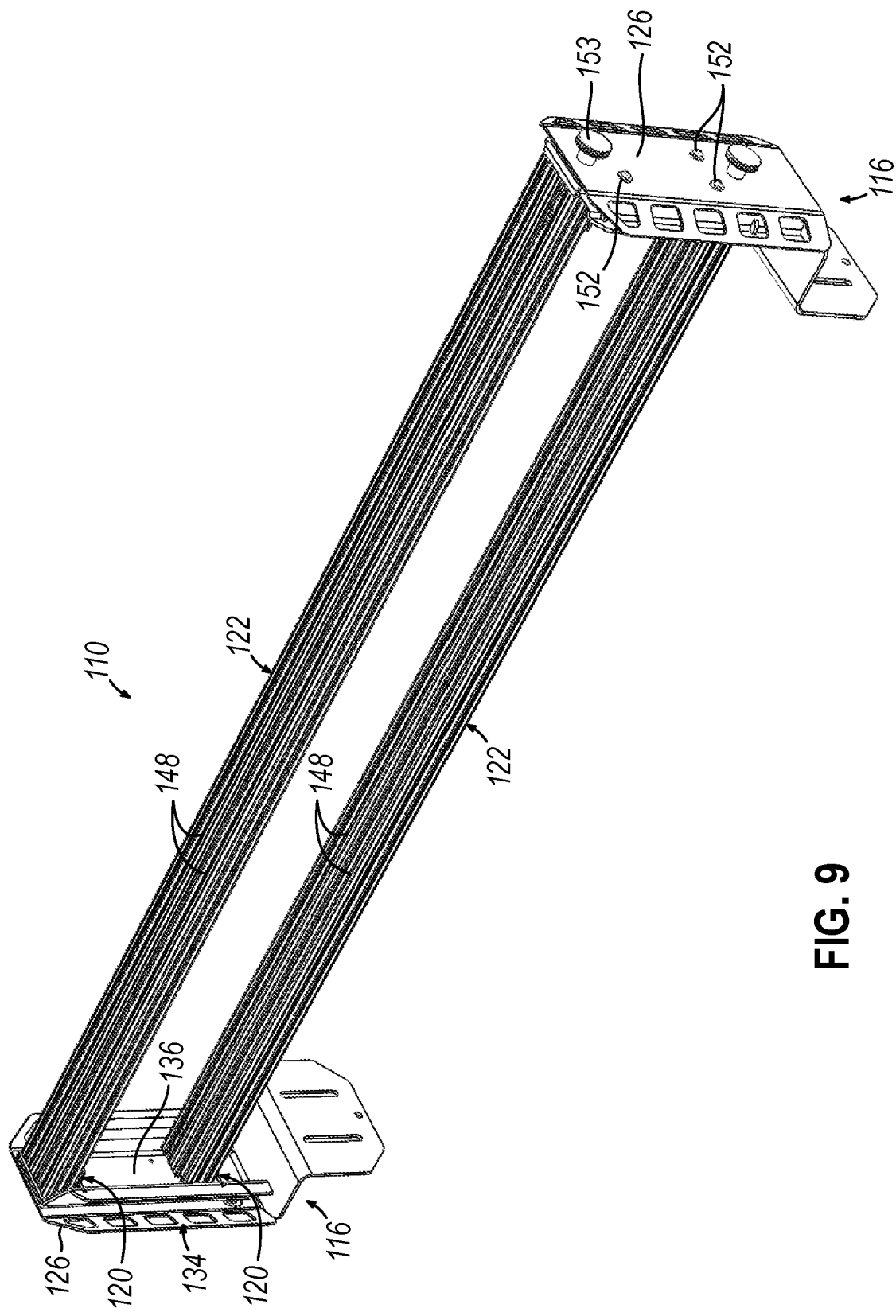
FIG. 9 depicts a perspective view of another example of a rack system configured to secure to a bed of a pickup truck.
Figure 10:
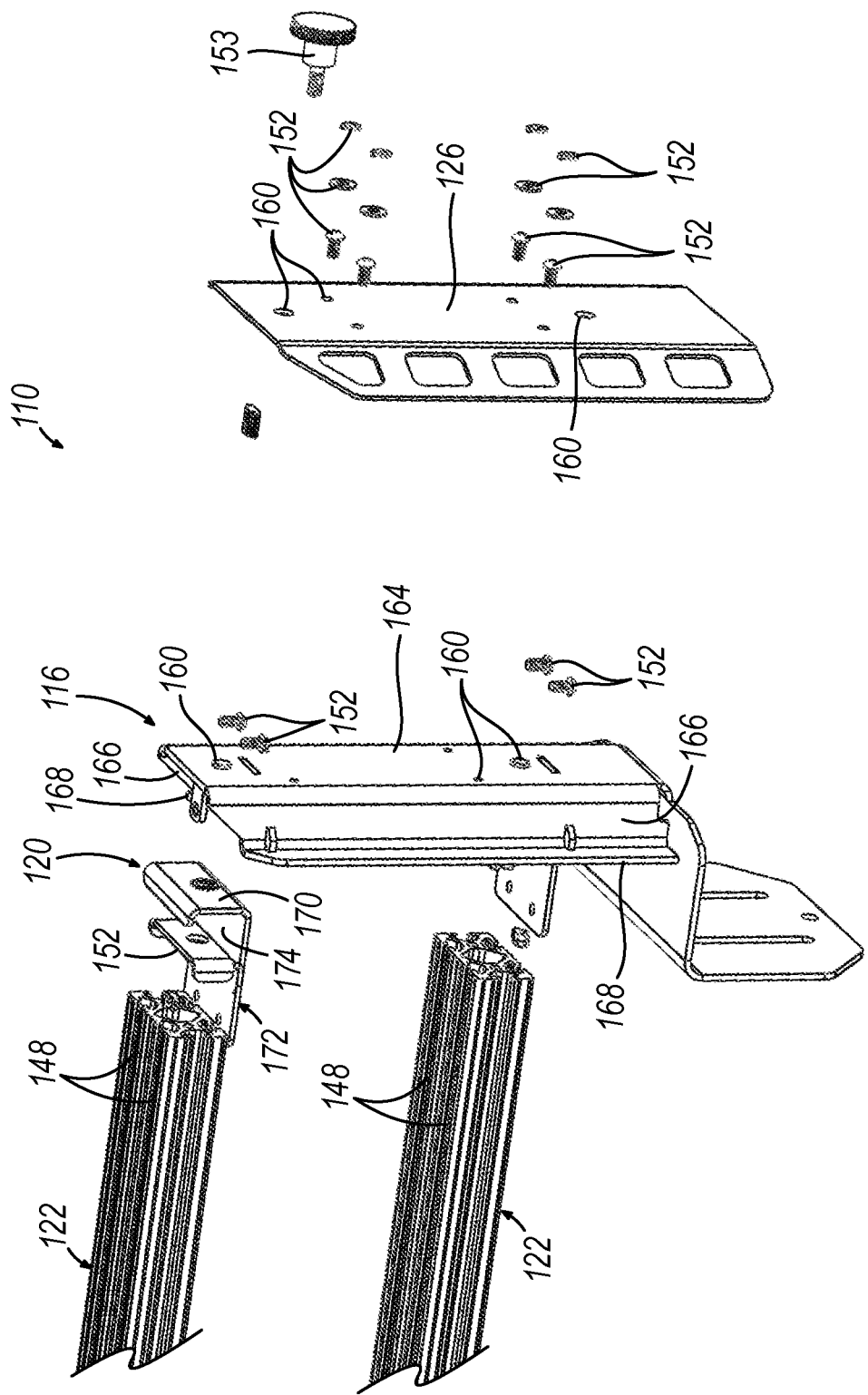
FIG. 10 depicts an enlarged, partially exploded perspective view of the rack system of FIG. 9.

FIGS. 9 and 10 show another exemplary of a rack system (110) with a plurality of upright support brackets (116), a plurality of stability brackets (120), a plurality of mounting bars (122), and a plurality of faceplates (126). To this end, support bracket (116), stability brackets (120), mounting bars (122), and faceplates (126) are like upright support brackets (16), stability brackets (20 mounting bars (22), and faceplates (26) discussed above in FIGS. 1-8D except as otherwise discussed below. Rack system (110) of the present example include two such upright support brackets (116) supporting two pairs of stability brackets (120) for a pair of mounting bars (122), although differing numbers of such components and features may be alternatively arranged such that the invention is not intended to be unnecessarily limited to the particular arrangement of rack system (110).

More particularly, the assembly of upright support brackets (116) to stability brackets (120), which is shown more particularly as a central stability bracket (120) is shown in FIG. 10 in greater detail. To this end, central stability bracket (120) includes a central bracket base (170) and a central shelf projection (172), which define a generally L-shape in the present example. In addition, central bracket base (170), while received within an upright bracket channel (136) of upright support bracket (116), connects to an upright bracket body (134) of upright support bracket (116) via holes (160) and fasteners (152, 153). Relative height positioning of central stability bracket (120) in upright bracket channel (136) may be selected and/or adjusted as desired by the user upon choosing appropriate holes (160) at differing vertical heights. Central shelf projection (172) of the present example is generally planar with a shelf bottom (174) thus configured to receive mounting bar (122) and further fastening thereto via T-slots (148) and fasteners (not shown). In this respect, according to one example, mounting bars (122) are configured to be secured relative to central stability bracket (120) without a threaded fastener, such as a threaded hole and/or threaded bolt, being threaded into engagement with mounting bar (122). Such avoidance of threaded coupling to mounting bar (122) in one example tends to increase the usable life of mounting bar (122), particularly when mounting bar (122) is formed of a relatively softer material, such as aluminum.

While upright bracket body (134) of the present example defines upright bracket channel (136), upright bracket body (134) more particularly includes a planar back plate (164) with planar sidewalls (166) extending therefrom in a U-shaped cross-section. Flared end portions (168) extend from each respective planar sidewalls (166) for additional coupling surfaces with holes (160) for greater stability and securement. During height adjustment, central bracket base (170) may thus be easily slid against upright bracket body (134) upward or downward through upright bracket channel (136) as desired by the user for repositioning.

In addition, selective removal and adjustment of mounting bar (122) and/or central stability bracket (120) relative to upright support brackets (116) may be further facilitated in one example with fastener (153), which is more particularly a quick-release, knob securement (153). Knob securement (153) is configured to be directly manipulated by a hand of the user without additional tools and without having to fully remove rack system (110) from pickup truck (14) (see FIG. 1). Such quick-release fasteners, such as knob securement (153), may be similarly incorporated into rack system (10) (see FIG. 1) discussed above. The user may thus more easily adjust one or more portions of rack systems (10, 110) for improved versatility, particularly in the field.

III. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A rack system for a vehicle, comprising: a first upright support bracket including a first upper portion and a first lower portion, the first upper portion having a first bracket body and a first bracket channel, the first lower portion configured to removably attach to the vehicle such that the first bracket channel extends upward therefrom; and a first stability bracket including a first shelf projection and a first bracket base, the first shelf projection extending from the first bracket base and having a first shelf bottom, the first bracket base of the first stability bracket configured to be removably secured to the first bracket body of the first upright support bracket within the first bracket channel of the first upright support bracket in a first predetermined position such that the first shelf bottom is configured to support a first mounting bar thereon.

Example 2

The rack system of Example 1, wherein the first shelf bottom of the first stability bracket transversely extends from the first bracket base of the first stability bracket.

Example 3

The rack system of any one or more of Examples 1 through 2, wherein the first bracket base of the first stability bracket is configured to be removably secured to the first bracket body of the first upright support bracket within the first bracket channel of the first upright support bracket such that the first shelf bottom of the first stability bracket transversely projects from the first bracket body of the first upright support bracket.

Example 4

The rack system of any one or more of Examples 1 through 3, wherein the first bracket base has a first shelf channel, and wherein the first shelf bottom is configured to support the first mounting bar thereon with the first mounting bar in the first shelf channel.

Example 5

The rack system of Example 4, wherein the first bracket base of the first stability bracket is configured to be removably secured to the first bracket body of the first upright support bracket within the first bracket channel of the first upright support bracket such that the first shelf channel of the first stability bracket transversely projects from the first bracket channel of the first upright support bracket.

Example 6

The rack system of any one or more of Examples 1 through 5, wherein the first bracket base of the first stability bracket is configured to be removably secured to the first bracket body of the first upright support bracket within the first bracket channel of the first upright support bracket in a second predetermined position different than the first predetermined position.

Example 7

The rack system of Example 6, further comprising a first knob securement configured to removably secure the first bracket base of the first stability bracket to the first bracket body of the first upright support bracket in the first predetermined position.

Example 8

The rack system of Example 7, wherein the first knob securement is configured to removably secure the first bracket base of the first stability bracket to the first bracket body of the first upright support bracket in the second predetermined position.

Example 9

The rack system of any one or more of Examples 1 through 8, wherein the first stability bracket is configured to removably connect to the first upright support bracket such that the first stability bracket extends vertically beyond the first upright support bracket.

Example 10

The rack system of Example 9, wherein the first stability bracket is configured to removably connect to the first upright support bracket such that the first stability bracket extends laterally beyond the first upright support bracket.

Example 11

The rack system of any one or more of Examples 1 through 10, further comprising a second stability bracket including a second shelf projection and a second bracket base, the second shelf projection extending from the second bracket base and having a second shelf bottom, the second bracket base of the second stability bracket configured to be removably secured to the first bracket body of the first upright support bracket within the first bracket channel of the first upright support bracket in the first predetermined position such that the first shelf bottom is configured to support the first mounting bar thereon.

Example 12

The rack system of Example 11, wherein the second bracket base of the second stability bracket configured to be removably secured to the first bracket body of the first upright support bracket within the first bracket channel of the first upright support bracket in a second predetermined position such that the first shelf bottom is configured to support the first mounting bar thereon.

Example 13

The rack system of Example 12, wherein the first stability bracket is configured to be mounted the first predetermined position for supporting the first mounting bar thereon while the second stability bracket is configured to be mounted in the second predetermined position for supporting a second mounting bar thereon.

Example 14

The rack system of any one or more of Examples 1 through 13, further comprising a first mounting bar, wherein the first mounting bar is configured to be secured relative to the first stability bracket without a threaded fastener engaging the first mounting bar.

Example 15

The rack system of any one or more of Examples 1 through 14, further comprising a first faceplate configured to removably connect to the first upright support bracket.

Example 16

The rack system of any one or more of Examples 1 through 15, further comprising a second upright support bracket including a second upper portion and a second lower portion, the second upper portion having a second bracket body and a second bracket channel, the second lower portion configured to removably attach to the vehicle such that the second bracket channel extends upward therefrom.

Example 17

The rack system of Example 16, further comprising an accessory panel configured to removably connect to each of the first upright support bracket and the second upright support bracket while extending therebetween.

Example 18

The rack system of any one or more of Examples 1 through 17, wherein at least the first upper portion of the first upright support bracket is of single, unitary construction and at least partially defines the first bracket channel.

Example 19

A method of selectively moving a mounting bar of a rack system on a vehicle, the rack system including a first upright support bracket and a first stability bracket, the first upright support bracket including a first upper portion and a first lower portion, the first upper portion having a first bracket body and a first bracket channel, the first lower portion configured to removably attach to the vehicle such that the first bracket channel extends upward therefrom, and the first stability bracket including a first shelf projection and a first bracket base, the first shelf projection extending from the first bracket base and having a first shelf bottom, the first bracket base of the first stability bracket configured to be removably secured to the first bracket body of the first upright support bracket within the first bracket channel of the first upright support bracket in a first predetermined position such that the first shelf bottom is configured to support a first mounting bar thereon, the method comprising: releasing the first stability bracket from the first upright support bracket in the first predetermined position; and selectively vertically moving the mounting bar from the first predetermined position to a second predetermined position.

Example 20

The method of Example 19, wherein the rack system further includes a first knob securement configured to removably secure the first bracket base of the first stability bracket to the first bracket body of the first upright support bracket in the first predetermined position, wherein releasing the first stability bracket from the first upright support bracket further includes releasing the first stability bracket from the first upright support bracket by manipulating first knob securement by hand without a tool.

Example 21

A method of selectively moving a truck bed cover relative to a mounting bar of a rack system on a vehicle, the rack system including a first upright support bracket and a first stability bracket, the first upright support bracket including a first upper portion and a first lower portion, the first upper portion having a first bracket body and a first bracket channel, the first lower portion configured to removably attach to the vehicle such that the first bracket channel extends upward therefrom, and the first stability bracket including a first shelf projection and a first bracket base, the first shelf projection extending from the first bracket base and having a first shelf bottom, the first bracket base of the first stability bracket configured to be removably secured to the first bracket body of the first upright support bracket within the first bracket channel of the first upright support bracket in a first predetermined position such that the first shelf bottom is configured to support a first mounting bar thereon, the method comprising: moving the truck bed cover toward an open portion or toward a closed position while the mounting bar of the rack system remains above the truck bed cover.

Example 22

The method of Example 21, wherein the moving the truck bed cover further includes folding the truck bed cover toward the open portion or toward the closed position while the mounting bar of the rack system remains above the truck bed cover.

Example 23

The method of Example 22, wherein the truck bed cover includes a truck bed tonneau cover.

IV. Miscellaneous

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A rack system for a vehicle, comprising:
   a first upright support bracket including a first upper portion and a first lower portion, the first upper portion having a first bracket body and a first bracket channel, the first lower portion configured to removably attach to the vehicle such that the first bracket channel extends upward therefrom;
   a first stability bracket including a first shelf projection and a first bracket base, the first shelf projection extending from the first bracket base and having a first shelf bottom, the first bracket base of the first stability bracket configured to be removably secured to the first bracket body of the first upright support bracket within the first bracket channel of the first upright support bracket in a first predetermined position in the first bracket channel;
   a second upright support bracket including a second upper portion and a second lower portion, the second upper portion having a second bracket body and a second bracket channel, the second lower portion configured to removably attach to the vehicle such that the second bracket channel extends upward therefrom;
   a second stability bracket including a second shelf projection and a second bracket base, the second shelf projection extending from the second bracket base and having a second shelf bottom, the second bracket base of the second stability bracket configured to be removably secured to the second bracket body of the second upright support bracket within the second bracket channel of the second upright support bracket in a second predetermined position in the second bracket channel; and
   a first mounting bar configured to be supported by the first and second shelf bottoms and horizontally extend therebetween in an assembled arrangement,
   wherein the first and second bracket channels vertically extend upward and in parallel alignment with each other in the assembled arrangement.

2. The rack system of claim 1, wherein the first shelf bottom of the first stability bracket transversely extends from the first bracket base of the first stability bracket.

3. The rack system of claim 1, wherein the first bracket base of the first stability bracket is configured to be removably secured to the first bracket body of the first upright support bracket within the first bracket channel of the first upright support bracket such that the first shelf bottom of the first stability bracket transversely projects from the first bracket body of the first upright support bracket.

4. The rack system of claim 1, wherein the first bracket base has a first shelf channel, and wherein the first shelf bottom is configured to support the first mounting bar thereon with the first mounting bar in the first shelf channel.

5. The rack system of claim 4, wherein the first bracket base of the first stability bracket is configured to be removably secured to the first bracket body of the first upright support bracket within the first bracket channel of the first upright support bracket such that the first shelf channel of the first stability bracket transversely projects from the first bracket channel of the first upright support bracket.

6. The rack system of claim 1, wherein the first stability bracket is configured to removably connect to the first upright support bracket such that the first stability bracket extends vertically beyond the first upright support bracket.

7. The rack system of claim 6, wherein the first stability bracket is configured to removably connect to the first upright support bracket such that the first stability bracket extends horizontally beyond the first upright support bracket.

8. The rack system of claim 1, further comprising a third stability bracket including a third shelf projection and a third bracket base, the third shelf projection extending from the third bracket base and having a third shelf bottom, the third bracket base of the third stability bracket configured to be removably secured to the first bracket body of the first upright support bracket within the first bracket channel of the first upright support bracket in a third predetermined position in the first bracket channel different than the first predetermined position in the first bracket channel.

9. The rack system of claim 8, further comprising a second mounting bar, wherein the third shelf bottom supports the second mounting bar relative to the first upright support bracket while the first shelf bottom supports the first mounting bar relative to the first upright support bracket in the assembled arrangement.

10. The rack system of claim 1, further comprising:
a third upright support bracket including a third upper portion and a third lower portion, the third upper portion having a third bracket body and a third bracket channel, the third lower portion configured to removably attach to the vehicle such that the third bracket channel extends upward therefrom;
a third stability bracket including a third shelf projection and a third bracket base, the third shelf projection extending from the third bracket base and having a third shelf bottom, the third bracket base of the third stability bracket configured to be removably secured to the third bracket body of the third upright support bracket within the third bracket channel of the third upright support bracket in a third predetermined position in the third bracket channel;
a second mounting bar configured to be supported by the third shelf bottom; and
a first crossbar configured to removably secure to each of the first mounting bar and the second mounting bar for horizontally extending therebetween.

11. The rack system of claim 10, further comprising an accessory panel configured to removably connect to each of the first upright support bracket and the third upright support bracket while extending therebetween.

12. The rack system of claim 1, wherein the first bracket body is generally U-shaped thereby defining a first opening into the first bracket channel, and wherein the second bracket body is generally U-shaped thereby defining a second opening into the second bracket channel.

13. The rack system of claim 12, wherein the first opening into the first bracket channel faces toward the second opening into the second bracket channel in the assembled arrangement.

14. The rack system of claim 13, wherein the first shelf projection in the assembled arrangement horizontally extends through the first opening toward the second upright support bracket, and wherein the second shelf projection in the assembled arrangement horizontally extends through the second opening toward the first upright support bracket.

15. The rack system of claim 13, wherein the first mounting bar is configured to horizontally extend through from the first bracket channel through the first opening and the second opening into the second bracket channel in the assembled arrangement.

16. A method of selectively moving a mounting bar of a rack system on a vehicle, the rack system including a pair of first upright support brackets and a pair of first stability brackets, each of the first upright support brackets including a first upper portion and a first lower portion, the first upper portion having a first bracket body and a first bracket channel, the first lower portion configured to removably attach to the vehicle such that the first bracket channel extends upward therefrom, and each of the first stability brackets including a first shelf projection and a first bracket base, the first shelf projection extending from the first bracket base and having a first shelf bottom, the first bracket base of the first stability bracket configured to be removably secured to the first bracket body of the first upright support bracket within the first bracket channel of the first upright support bracket in a first predetermined position such that the first shelf bottom is configured to support a first mounting bar thereon horizontally between the pair of first stability brackets, the method comprising:
releasing each the first stability brackets respectively from the first upright support brackets in the first predetermined position while the first mounting bar is secured relative to each of the first shelf bottoms; and
selectively vertically moving the first mounting bar from the first predetermined position to a second predetermined position while the first mounting bar is secured relative to each of the first shelf bottoms without changing a length of the first mounting bar.

17. The method of claim 16, wherein the rack system further includes a first knob securement configured to removably secure the first bracket base of the first stability bracket to the first bracket body of the first upright support bracket in the first predetermined position, wherein releasing the first stability bracket from the first upright support bracket further includes releasing the first stability bracket from the first upright support bracket by manipulating first knob securement by hand without a tool.

18. A rack system for a vehicle, comprising:
a first upright support bracket including a first upper portion and a first lower portion, the first upper portion having a first bracket body and a first bracket channel, the first lower portion configured to removably attach to the vehicle such that the first bracket channel extends upward therefrom;
a first stability bracket including a first shelf projection and a first bracket base, the first shelf projection extending from the first bracket base and having a first shelf bottom, the first bracket base of the first stability bracket configured to be removably secured to the first bracket body of the first upright support bracket within the first bracket channel of the first upright support bracket in a first predetermined position in the first bracket channel;
a second upright support bracket including a second upper portion and a second lower portion, the second upper portion having a second bracket body and a second bracket channel, the second lower portion configured to removably attach to the vehicle such that the second bracket channel extends upward therefrom;
a second stability bracket including a second shelf projection and a second bracket base, the second shelf projection extending from the second bracket base and having a second shelf bottom, the second bracket base of the second stability bracket configured to be removably secured to the second bracket body of the second upright support bracket within the second bracket channel of the second upright support bracket in a second predetermined position in the second bracket channel;

a third stability bracket including a third shelf projection and a third bracket base, the third shelf projection extending from the third bracket base and having a third shelf bottom, the third bracket base of the third stability bracket configured to be removably secured to the first bracket body of the first upright support bracket within the first bracket channel of the first upright support bracket in a third predetermined position in the first bracket channel different than the first predetermined position in the first bracket channel;

a fourth stability bracket including a fourth shelf projection and a fourth bracket base, the fourth shelf projection extending from the fourth bracket base and having a fourth shelf bottom, the fourth bracket base of the fourth stability bracket configured to be removably secured to the second bracket body of the second upright support bracket within the second bracket channel of the second upright support bracket in a fourth predetermined position in the second bracket channel different than the second predetermined position in the second bracket channel;

a first mounting bar configured to be supported by the first and second shelf bottoms and horizontally extend therebetween in an assembled arrangement; and a second mounting bar configured to be supported by the third and fourth shelf bottoms and horizontally extend therebetween in the assembled arrangement.

19. The rack system of claim 18, wherein the first and second bracket channels vertically extend upward and in parallel alignment with each other in the assembled arrangement.

20. The rack system of claim 18, wherein the first bracket body is generally U-shaped thereby defining a first opening into the first bracket channel, and wherein the second bracket body is generally U-shaped thereby defining a second opening into the second bracket channel, wherein the first opening into the first bracket channel faces toward the second opening into the second bracket channel in the assembled arrangement.

* * * * *